United States Patent Office 3,297,085
Patented Jan. 10, 1967

3,297,085
VISCOSITY CONTROL IN A MISCIBLE
RECOVERY TECHNIQUE
Joseph C. Herring, Littleton, Colo., assignor to Marathon Oil Company, Findlay, Ohio, a corporation of Ohio
No Drawing. Filed Sept. 9, 1963, Ser. No. 307,339
11 Claims. (Cl. 166—9)

This invention relates to the recovery of fluid hydrocarbons from subterranean formations by injecting into a formation a slug of soluble oil of modulated viscosity, driving the slug through the formation with a drive fluid, and recovering the displaced oil from the formation.

Ideally, a flood material used in oil recovery should be miscible with the oil in the formation and should have a viscosity at least as great as that of the petroleum fluids to be recovered. It should also be inexpensive. This latter requisite has been the rock on which most flooding materials have floundered. As a compromise, those skilled in the art have suggested the use of a slug of material miscible with the crude followed by a slug of material miscible with the first injected slug and with water. Water is used to drive the dual-slug bank through the formation.

The bank should also be gradually tapered in viscosity from that of the crude at the leading edge of the first slug of the bank to that of water at the trailing edge of the second slug.

Petroleum may be recovered from subterranean formations by injecting a slug of soluble oil into the formation and driving the soluble oil slug through the formation with water. The soluble oil is compatible with petroleum and achieves an almost perfect recovery of oil from the portions of a formation swept. "Compatible" as used herein is synonymous with "miscible" except where there is an internal phase which is substantially immiscible with the substance the external phase is designed to contact. There is no miscibility between that substance and the internal phase. The procedure utilizing soluble oils containing a dispersed water phase is more fully described in copending United States patent application Serial No. 212,134, filed on July 24, 1962.

The soluble oils used in petroleum recovery to date have used an alkylaryl naphthenic monosulfonate surfactant. The addition of water to these soluble oils increases their apparent viscosity. Apparent viscosity is defined as the ratio of shear stress to rate of shear, the shear stress exhibited by the liquid being the result of the particular rate of shear. If this viscosity increase is not compensated for, the viscosity profile will show unwanted peaks, which increase required pumping pressures and otherwise reduce the efficiency of the flooding production.

It is the objective of this invention to ameliorate or nullify increases in viscosity caused by water sorption in subterranean formations. The sorption of water occurs in formations containing appreciable amounts of water; for example, in a tertiary flood undertaken after completion of a water flood. In such a situation, the leading edge of the slug of soluble oil as well as the trailing edge of the slug will contact large volumes of water and will tend to take up some of this water. The slug would also take up water from a slug of water-external emulsion which might be injected after the soluble oil to form a bank, of two slugs, which would be compatible at both the leading and trailing edges of the bank.

The process of this invention comprises injecting into a subterranean formation a series of slugs of soluble oil, the slug or slugs of soluble oil which are to contact large amounts of water being of a viscosity lower than that of the remaining slug or slugs. When water is mixed into these low-viscosity slugs, the viscosity of the contacted slugs rises to about that of the higher viscosity slugs which have not been in contact with appreciable amounts of water. The result of this procedure is to provide a method of maintaining a desired viscosity profile throughout a soluble oil bank.

The term soluble oil, as used in this application includes the usual soluble oils of commerce which are mixtures of nonpolar compounds, such as hydrocarbons, and one or more surfactants. It also includes the nonturbid oil-external dispersions containing water which are prepared from the soluble oils of commerce wherein the average diameter of the internal phase is less than the wave length of light and which form turbid emulsions on addition of water.

Viscosity control within the soluble oil bank can be achieved in a number of ways. Thus, in a tertiary recovery in a formation containing 50–60% water, a slug of soluble oil made up with a low-viscosity hydrocarbon would be initially injected; a second soluble oil slug made up from high-viscosity hydrocarbon would be injected next; and an oil-miscible thickened flood material utilized to drive the soluble oil slugs through the formation. Alternately, if a water-external emulsion or water per se were to follow the soluble oil bank, a third slug of soluble oil would be injected. This last slug could be prepared from the low-viscosity hydrocarbon which was utilized to make up the initial slug.

In the last alternative process, the water from the water-external emulsion or from the water drive would mix into low-viscosity soluble oil bringing it up to about that of its adjacent fluids.

The soluble oils to which the process of this invention is applicable are the soluble oils made up of hydrocarbon, water, and an alkylarly naphthenic monosulfonate. Isopropanol can be utilized as a coupling agent if necessary. Other soluble oils can be prepared utilizing the surfactants set out in the aforementioned copending United States patent application Serial No. 212,134.

Suitable hydrocarbons and their inherent viscosities are set out in the table below. The viscosities of other hydrocarbons can be determined readily by reference to the literature.

| Hydrocarbon | Temp., °C. | Viscosity (cps.) |
| --- | --- | --- |
| n-Pentane | 20 | 0.240 |
| n-Octane | 20 | 0.542 |
| n-Nonane | 20 | 0.711 |
| Light machine oil | 15.6 | 113.8 |
| Heavy machine oil | 15.6 | 660.6 |

To select suitable soluble oil formulations for use as slugs in a particular petroleum recovery, a series of soluble oil slugs are made up of desired initial water concentrations and utilizing hydrocarbons of varying viscosities. Additional water is mixed into each aliquot of soluble oil to obtain a viscosity equivalent to the crude to be recovered. These amounts are compared with the viscosity of the crude in the formation and the water content of the formation. Mixing rates within the formation can be determined from flooding cores from the formation to be flooded with various soluble oils until the desired combinations of slugs are determined.

Normally, each soluble oil slug of reduced viscosity need be only 5–10% of the total volume of soluble oil slugs. Larger or smaller portions can be of reduced viscosity if the situation so demands.

The following example more fully illustrates this invention; however, it is not intended that the invention be limited to the particular slugs utilized, the particular hydrocarbons or surfactants. Rather, it is intended that all equivalents obvious to those skilled in the art be included within the scope of the invention as claimed.

*Example I*

Oil is recovered from a Pennsylvania sand of the Illinois Basin at a depth of around 950 feet by the injection of 3 slugs of soluble oil followed by a water injection through the 4 injection wells of a regular five-spot pattern. The sand section is about 10 feet thickness, has a permeability of about 150 md., an oil saturation of about 35%, and a water saturation of about 65% of the pore volume. The crude viscosity is about 11 cp. Three soluble oil slugs were made up having volumes of 1,500 bbls.; 12,500 bbls.; and 1,500 bbls., rspectively. The first and last slugs of the bank are made up of 19% water; 4.75% isopropanol; and 76.25%, by volume, of a 4:1 mixture of pentane and an oil-soluble alkylaryl naphthenic monosulfonate having an empirical formula approximating $C_nH_{2n-10}SO_3Na$, wherein $n$ is 25–30 and the alkyl radical contains from about 5 to about 20 carbon atoms. This surfactant can be purchased from Shell Chemical Company as a solution of 62% sulfonate in oil. This sulfonate is described in Shell Technical Bulletin S.C.: 60–47. These slugs have a viscosity of about 4.5 cp. which rises to about that of the oil in the formation when an additional 10% of water is mixed into these slugs.

The large slug is made up of 22–24% water, 3.8% isopropanol, and a mixture of 84% straight run gasoline and 16% of the sulfonate surfactant. The viscosity of this material is about 11.

These slugs are injected into the formation at any convenient rate and preferably at a rate so as to establish a frontal movement within the formation of about 2–4 feet/day. After the slugs have been injected into the formation, water is injected into the formation at the rate of about 60–150 bbls./day. Water injection is continued until economic recovery through the central well of the five-spot is no longer economical.

From about 1 to about 30% of the formation pore volume of soluble oil slugs is effective for oil recovery, but preferably 2–10% slug volume soluble oil is utilized.

Now having described my invention, what I claim is:

1. The process for recovering petroleum hydrocarbon from hydrocarbon-bearing, subterranean formations comprising injecting into the formation, through at least one injection well, a plurality of slugs made up of soluble oils, the first of said slugs having a viscosity lower than the remainder of said plurality; thereafter, injecting at least one drive material into said formation to displace the hydrocarbon within the formation; and recovering fluid hydrocarbon from said formation through at least one production well drilled into said formation.

2. The process of claim 1 wherein the initial and last soluble oil slugs are of lower viscosity and at least one slug of higher viscosity is positioned therebetween.

3. The process comprising injecting into a subterranean hydrocarbon-bearing formation a low viscosity soluble oil slug having, as the nonpolar external phase, a low viscosity hydrocarbon; injecting into said formation a soluble oil slug of relatively higher viscosity, said viscosity being at least about as high as that of the viscosity of the crude in the formation and containing, as the nonpolar external phase, a liquid hydrocarbon of higher viscosity than the viscosity of the hydrocarbon of the first injected slug; injecting an amount of water into the formation, through wells previously utilized for the injection of the soluble oil slugs, sufficient to displace hydrocarbons in the formation; and recovering fluid hydrocarbons from the formation through at least one recovery well drilled therein.

4. The process of claim 3 wherein, just prior to the injection of water, a low viscosity soluble oil slug having, as the nonpolar external phase, a low viscosity hydrocarbon is injected into the formation.

5. The process of claim 4 wherein a water-external emulsion is injected into the formation after the injection of the second low viscosity soluble oil slug and prior to the injection of water into the formation.

6. The process of claim 3 wherein the soluble oils are comprised of a hydrocarbon, water, and an alkylaryl naphthenic monosulfonate.

7. The process comprising injecting into an oil-bearing subterranean formation, through at least one injection well drilled therein, a plurality of soluble oil, hydrocarbon external slugs of a hydrocarbon, substantial water, and an alkylaryl naphthenic monosulfonate, the first of the slugs having a viscosity lower than the remainder of said plurality and said slug having a hydrocarbon of lower viscosity than the hydrocarbon of the remainder of said plurality as the external phase; thereafter, injecting at least one drive material into the formation to displace the hydrocarbon within the formation and recovering fluid hydrocarbon from said formation through at least one production well drilled into said formation.

8. The process of claim 7 wherein the initial and last soluble oil slugs are of lower viscosity and at least one slug of higher viscosity is positioned therebetween.

9. The process comprising mixing slugs of hydrocarbons of various viscosities, water, and a surfactant to form soluble oils of viscosities generally relating to the viscosity of the hydrocarbon from which the soluble oil is formulated; injecting into a subterranean formation bearing fluid hydrocarbons, through at least one injection well drilled therein, the soluble oil slugs in predetermined sequence so that slugs of soluble oils contacting substantial amounts of water are of a viscosity lower than any of the remaining slugs; thereafter, injecting into the formation, through substantially the same wells, a drive material in amounts effective to displace the hydrocarbon in the formation toward at least one production well drilled into the formation; and producing fluid hydrocarbon from the formation.

10. The process of claim 9 wherein each of the low viscosity hydrocarbon slugs comprises 5–10% of the total volume of soluble oil slugs and wherein the total soluble oil slug volume comprises 1–30% of the pore volume of the subterranean formation.

11. The process of claim 9 wherein the total volume of soluble oil slugs comprises 2–10% of the pore volume of the subterranean formation.

References Cited by the Examiner

UNITED STATES PATENTS

| | | | |
|---|---|---|---|
| 2,867,277 | 1/1959 | Weinaug et al. | 166—42 X |
| 2,988,142 | 6/1961 | Maly | 166—9 |
| 3,163,214 | 12/1964 | Csaszar | 166—9 |

OTHER REFERENCES

Slobod, R. L., et al.: Use of a Graded Viscosity Zone To Reduce Fingering in Miscible Phase Displacements. In Producers Monthly, August 1960, pp. 12, 14–16, 18 and 19 relied on TN 860.P7.

CHARLES E. O'CONNELL, *Primary Examiner.*

T. A. ZALENSKI, S. J. NOVOSAD, *Assistant Examiners.*